United States Patent [19]

Bolle

[11] 4,405,214
[45] Sep. 20, 1983

[54] SAFETY GLASSES

[75] Inventor: Maurice Bolle, Oyonnax, France

[73] Assignee: Etablissements Bolle Georges, Robert et Maurice, Oyonnax, France

[21] Appl. No.: 229,944

[22] Filed: Jan. 30, 1981

[30] Foreign Application Priority Data

Feb. 4, 1980 [FR] France ............................ 80 02353

[51] Int. Cl.³ ........................................... G03B 21/32
[52] U.S. Cl. ...................................... 351/88; 351/86; 351/132; 351/138
[58] Field of Search ................ 351/88, 94, 131, 132, 351/136, 138; 2/442, 445, 446

[56] References Cited

U.S. PATENT DOCUMENTS

| | | | |
|---|---|---|---|
| 2,444,498 | 7/1948 | Cochran | 2/442 X |
| 2,774,279 | 12/1956 | Olson et al. | 351/94 |
| 3,189,913 | 6/1965 | Hoffmaster | 351/130 |
| 3,209,366 | 9/1965 | Lindblom | 351/94 X |
| 3,391,976 | 7/1968 | Lindblom | 351/88 X |
| 3,584,939 | 6/1971 | Olson et al. | 351/132 |

FOREIGN PATENT DOCUMENTS 2395522  1/1979  France .

Primary Examiner—F. L. Evans
Attorney, Agent, or Firm—Karl F. Ross; Herbert Dubno

[57] ABSTRACT

Safety glasses for use, in particular, in sporting activities comprise a frame to which two limbs are articulated, two lenses mounted on the inside of grooved retaining circles formed in the frame and a nose rest piece which fits together with the frame, is made of flexible material and has walls which form a part of the said grooved retaining circles. In such glasses therefore the lenses are partly held by flexible material which avoids their being broken in the case of a heavy blow as may for example occur when playing a sport. The risks therefore of cuts or injuries to the wearer of the glasses are reduced.

6 Claims, 6 Drawing Figures

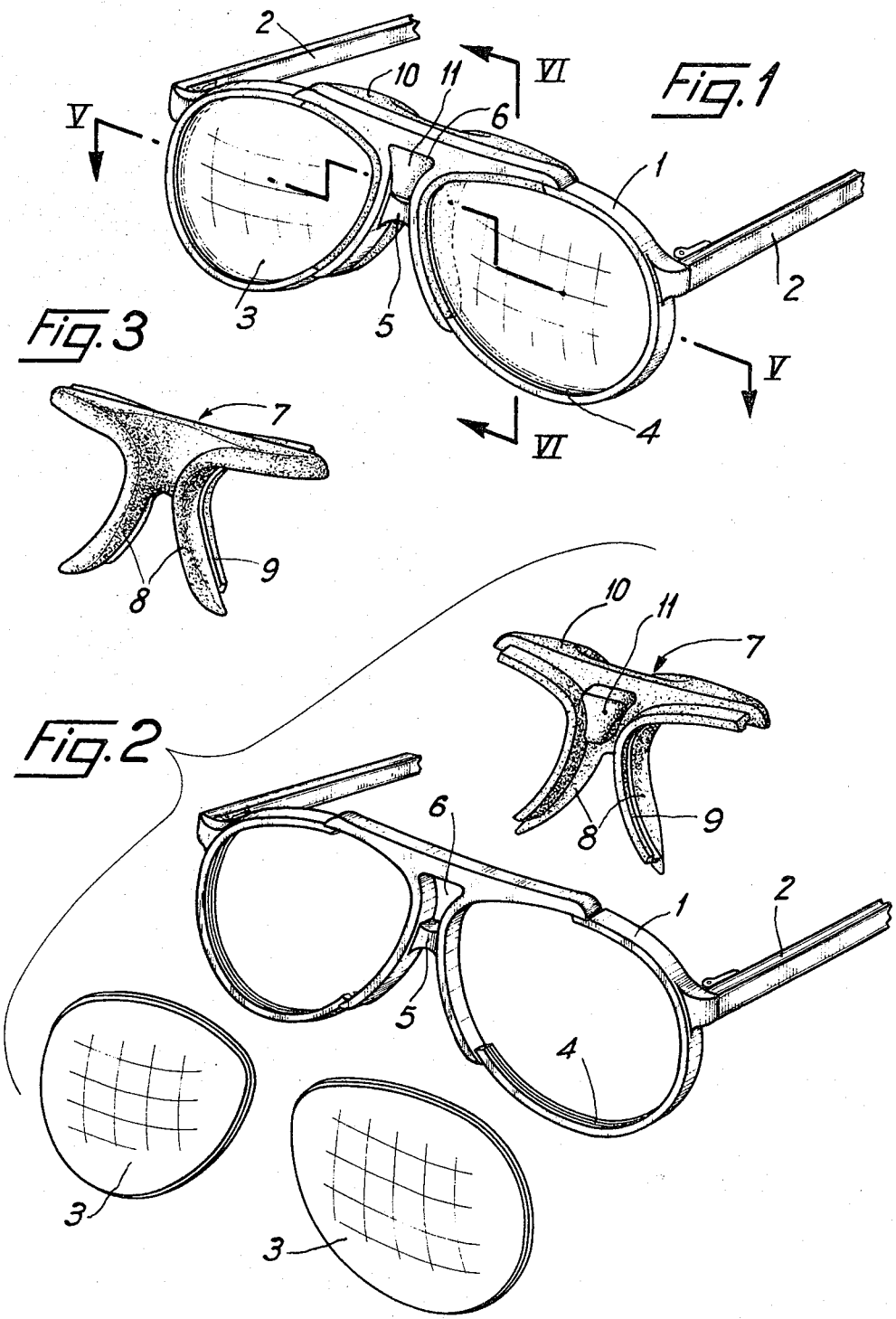

SAFETY GLASSES

FIELD OF THE INVENTION

This invention relates to safety glasses for use, in particular, in sporting activities.

BACKGROUND OF THE INVENTION

It is known that in different sports, there is a not negligible risk of blows and can cause breaking of glasses, which in turn unfortunately result in cuts or injuries to the wearer of the glasses.

For the sake of comfort, glasses have already been proposed in which the nose rest is made of flexible material, such as foam rubber or polyvinyl chloride (PVC), enabling the glasses to be worn for longer periods than those with a rigid nose piece. Such glasses are in particular described in the published specification of French patent application No. 2 395 522. However it is necessary to note that the use of such nose rests does not reduce the risk of accident.

OBJECT OF THE INVENTION

The object of the present invention is to overcome the inconveniences resulting from the wearing of glasses in the case of blows.

SUMMARY OF THE INVENTION

According to the present invention there is provided a pair of safety glasses which comprises a frame to which two limbs are articulated, two lenses mounted on the inside of grooved retaining circles formed in the frame, and a nose rest piece which fits together with the frame, is made of a flexible material and has walls which form a part of the grooved retaining circles.

Thus the lenses are partly held by flexible material which avoids their being broken in the case of a heavy blow.

The frame is suitably cast in one piece.

According to one feature of the invention, the nose rest is extended on its upper part by a horizontal wall to constitute a forehead rest Advantageously the nose rest piece is secured in the frame by the mounting of the lenses in the inside of the grooved retaining circles.

Preferably the nose rest piece carries a projecting part which cooperates with an opening formed between a bridge disposed between the grooved retaining circles, the grooved retaining circles and the frame such that the nose rest piece is held in the frame.

BRIEF DESCRIPTION OF THE DRAWING

In the drawing

FIG. 1 shows a pair of glasses according to the present invention;

FIG. 2 is an exploded view of the glasses of FIG. 1;

FIG. 3 is a rear view of the piece of flexible material of the nose rest;

SPECIFIC DESCRIPTION

Figure 4:
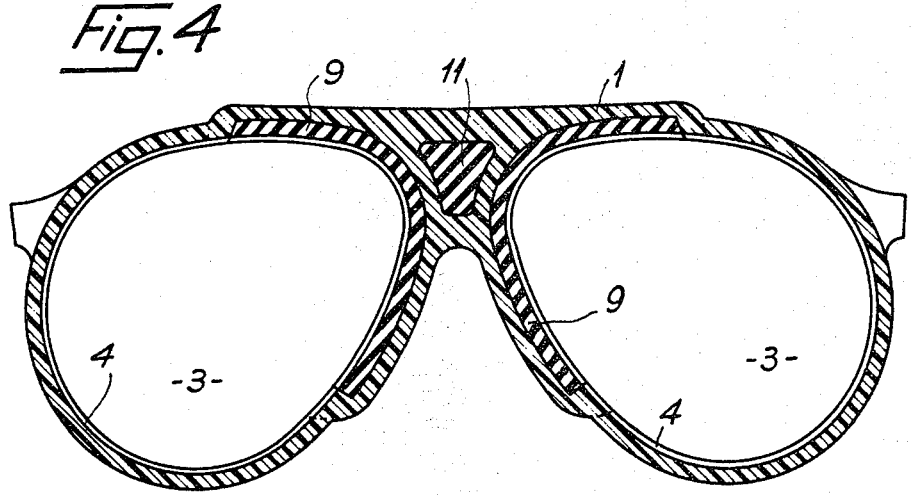
FIG. 4 is a vertical section through the glasses of FIG. 1.

As can be seen from FIGS. 1 and 2, the glasses according to the present invention comprise, in conventional manner, a frame 1 to which two limbs 2 are articulated at the two extremities, the lenses 3 being mounted on the inside of grooved retaining circles 4 formed in the frame. Between the lenses is disposed a small bridge 5. Above the bridge 5 an opening 6 is formed in the frame for the anchoring of the piece of flexible material 7 made for example of foam rubber or PVC and which performs three functions. By its walls 8 (see FIG. 3) it constitutes a nose rest which is supported more easily than conventional rigid tests. On the side opposite from walls 8, it provides part of the grooved retaining surface by virtue of the form of the walls 9 which is identical to that of the walls of the grooved retaining circles 4 which, as can be seen from FIG. 2, are interrupted so as to be completed by the walls 9 of the piece 7. The piece 7 is extended on its upper part by a wall 10 slightly curved inwards to form a flexible forehead support for the glasses. The fixing of the piece 7 is achieved very easily by pressing the piece against the frame which causes the projecting part 11 to penetrate into the opening 6.

After the flexible piece is anchored to the frame, the lenses are fitted in inside of the grooved retaining circles 4.

Figure 5:
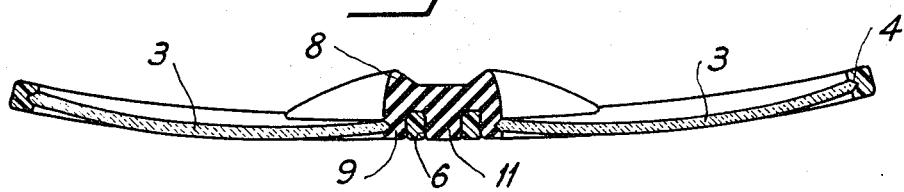
FIG. 5 is a section along the line V—V in FIG. 1.
Figure 6:
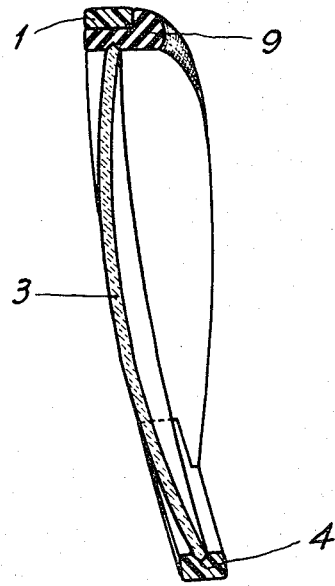
FIG. 6 is a section along the line VI—VI of FIG. 1.

FIGS. 4, 5 and 6 show sections through a pair of glasses according to the invention in which lenses 3 have been fitted.

It can be seen from FIG. 4 that the walls 9 of the piece 7 ensure the continuity of the grooved retaining circles and even allow by their flexibility the lenses to be ejected in the case of blows.

From FIG. 5 there can be seen the walls 8 which comprise the surface of the nose rest and the walls 9 which comprise the surfaces supporting the lenses 3.

From FIG. 6, there can be seen the lens 3 which bears at its lower part against the grooved retaining circle 4 and at its upper part against the wall 9 of the flexible piece 7.

It is to be noted that the fixing of the flexible piece into the frame is such that it is secured by the lens rest on the flexible support 9 like the grooved retaining circle of which it forms a part.

In order to avoid perspiration in the region of the nose and forehead rests, air circulation may be established by means of grooves or holes in the flexible part.

Modification may be made in the manner of realisation described, especially by substitution of equivalent technical means, without going outside the scope of the invention.

I claim:

1. In a pair of safety glasses comprising a frame, to which two limbs are articulated, two lenses mounted on the inside of grooved retaining circles formed in the said frame, and a nose rest piece which fits together with the frame and is made of flexible material, the improvement wherein each of said circles is unitarily formed with lens-receiving grooves terminating in the region of said nose rest piece and with a nongrooved portion in said region, said nose rest piece having grooved walls overlying said nongrooved portions and which form part of the said grooved retaining circles by completing the lens-receiving grooves in said regions.

2. A pair of glasses according to claim 1 wherein the said nose rest piece is extended on its upper part by a horizontal wall to form a forehead rest.

3. A pair of safety glasses according to claim 1 or claim 2 wherein the nose rest piece is secured in the frame by the mounting of the lenses in the inside of the grooved retaining circles.

4. A pair of safety glasses according to claim 1 wherein the nose rest piece carries a projecting part which cooperates with an opening formed between a bridge disposed between the grooved retaining circles, the grooved retaining circles themselves and the frame such that the nose rest piece is held in the frame.

5. A pair of safety glasses according to claim 2 wherein the nose rest piece carries a projecting part which cooperates with an opening formed between a bridge disposed between the grooved retaining circles, the grooved retaining circles themselves and the frame such that the nose rest piece is held in the frame.

6. A pair of safety glasses according to claim 3 wherein the nose rest piece carries a projecting part which cooperates with an opening formed between a bridge disposed between the grooved retaining circles, the grooved retaining cirlces themselves and the frame such that the nose rest piece is held in the frame.

* * * * *